United States Patent [19]

Divins et al.

[11] 4,230,672

[45] Oct. 28, 1980

[54] APPARATUS FOR RECOVERING NUCLEAR FUEL FROM SCRAP MATERIAL

[75] Inventors: Larry A. Divins; Larry E. Short, both of Wilmington, N.C.

[73] Assignee: General Electric Company, San Jose, Calif.

[21] Appl. No.: 972,525

[22] Filed: Dec. 24, 1978

Related U.S. Application Data

[62] Division of Ser. No. 831,689, Sep. 8, 1977.

[51] Int. Cl.[2] .......................... B01J 1/00; G21F 9/30

[52] U.S. Cl. .......................... 422/159; 252/301.1 W; 423/4; 423/20; 422/189

[58] Field of Search ............ 423/4, 20; 252/301.1 W; 422/159, 187, 189

[56] References Cited

U.S. PATENT DOCUMENTS

| | | | |
|---|---|---|---|
| 3,488,162 | 1/1970 | Towski | 423/20 |
| 3,578,419 | 5/1971 | Welty | 423/4 |
| 3,776,856 | 12/1973 | Scheffler et al. | 252/301.1 W |

OTHER PUBLICATIONS

Thompson et al., "Fluidized Bed Calcination of Radioactive Wastes using In-Bed Combustion Heating", Nuclear Technology, vol. 16, Nov. 1972, pp. 396-405.

*Primary Examiner*—Arnold Turk

*Attorney, Agent, or Firm*—Ivor J. James, Jr.; Samuel E. Turner; Sam E. Laub

[57] ABSTRACT

Process for recovering compounds of enriched nuclear fuel from scrap materials is disclosed. The process yields an acid solution with the nuclear fuel dissolved therein. Except for spent filter media, the scrap materials are calcined to produce an oxidized material, which is reduced to a particulate material and leached in an acid bath that contains some recycled acid to yield an acid solution of the nuclear fuel material. The scrap materials comprised of spent filter media are mulched and contacted with the acid solution. The insoluble materials are separated from the acid solution, and at least a portion of the acid solution is recycled to the leaching step, while the remainder of the acid solution is collected for subsequent treatment to recover the dissolved nuclear fuel material. Apparatus for performing the foregoing process is also disclosed.

3 Claims, 4 Drawing Figures

APPARATUS FOR RECOVERING NUCLEAR FUEL FROM SCRAP MATERIAL

CROSS REFERENCE TO RELATED INVENTION

This is a divisional of application Ser. No. 831,689, filed Sept. 8, 1977.

BACKGROUND OF THE INVENTION

This invention relates to a process and an apparatus for recovering nuclear fuel materials such as uranium oxide compounds from scrap materials containing such compounds.

The residue (herein generally called "scrap" or "scrap materials") from many nuclear fuel processing operations can be in various forms and contain a sufficiently high concentration of the nuclear fuel to justify its recovery. Generally, one of the preliminary steps in a nuclear fuel recovery process comprises calcining scrap materials to remove the volatile matter and then dissolving the soluble portion of the resulting calcine in an acid. Such a process has been conducted using a calciner and a slab-shaped leaching apparatus.

The prior art also includes dry processes for nuclear fuel recovery from scrap, with a representative process being disclosed in U.S. Pat. No. 3,578,419 in the name of Richard K. Welty and assigned to the same assignee as the present invention. This patent discloses a process for recovering hard scrap nuclear reactor fuel material in which the scrap is first oxidized in a fluidized bed and then comminuted, after which the oxidized material is reduced back to the original chemical form prior to the oxidation step with improved sintering characteristics.

The foregoing processes are not suitable for the efficient recovery of enriched nuclear fuel, such as uranium compounds, from filter media used to filter the air drawn from nuclear fuel processing operations. Typically, these filters (e.g., High Efficiency Particulate Air or HEPA filters) are made of fiberglass or include some fiberglass in the filter media. When incinerated, the fiberglass forms a clinker that can encapsulate the uranium and is insoluble in most commonly used acids.

In the past, ventilation filters have simply been disposed of by burial, or have been acid leached as a whole unit in a large tank. The leaching of filter media precludes complete recovery of the nuclear fuel and is, in addition, a manpower intensive operation that utilizes large volumes of acid.

Typically, the materials other than filter media containing small amounts of enriched nuclear fuel result from the processing of the enriched nuclear fuel into a form, commonly oxide or carbide, suitable for utilization in nuclear reactors. In greater detail, such materials are rags, uniforms, gloves, plastic, oils, etc. It has been found that when such materials are incinerated, they form chunks of various sizes that need to be comminuted or ground to a smaller uniform size in order to be efficiently leached in an acid solution. Accordingly, it has remained desirable to have a system for the efficient recovery of nuclear fuel materials from filter media, incinerator ash and other particulate materials.

OBJECTS OF THE INVENTION

It is an object of this invention to provide a process for recovering nuclear fuel material from filter media and other scrap materials by converting these materials to a form suitable for leaching the nuclear fuel from these materials in an acid solution.

Another object of this invention is to provide a process for recovering nuclear fuel materials from filter media and other scrap material designed to be totally safe from a consideration of nuclear criticality through all stages of operation.

Still another object of this invention is to provide a process for recovering nuclear fuel from ventilation filters and other scrap materials in the form of a solution highly concentrated in the nuclear fuel through use of a recycle step for recirculating a portion of the solution to a leaching step.

Other objects and advantages of this invention will become apparent from the following detailed description and the claims appended hereto and by reference to the attached drawings.

SUMMARY OF THE INVENTION

Figure 1A:
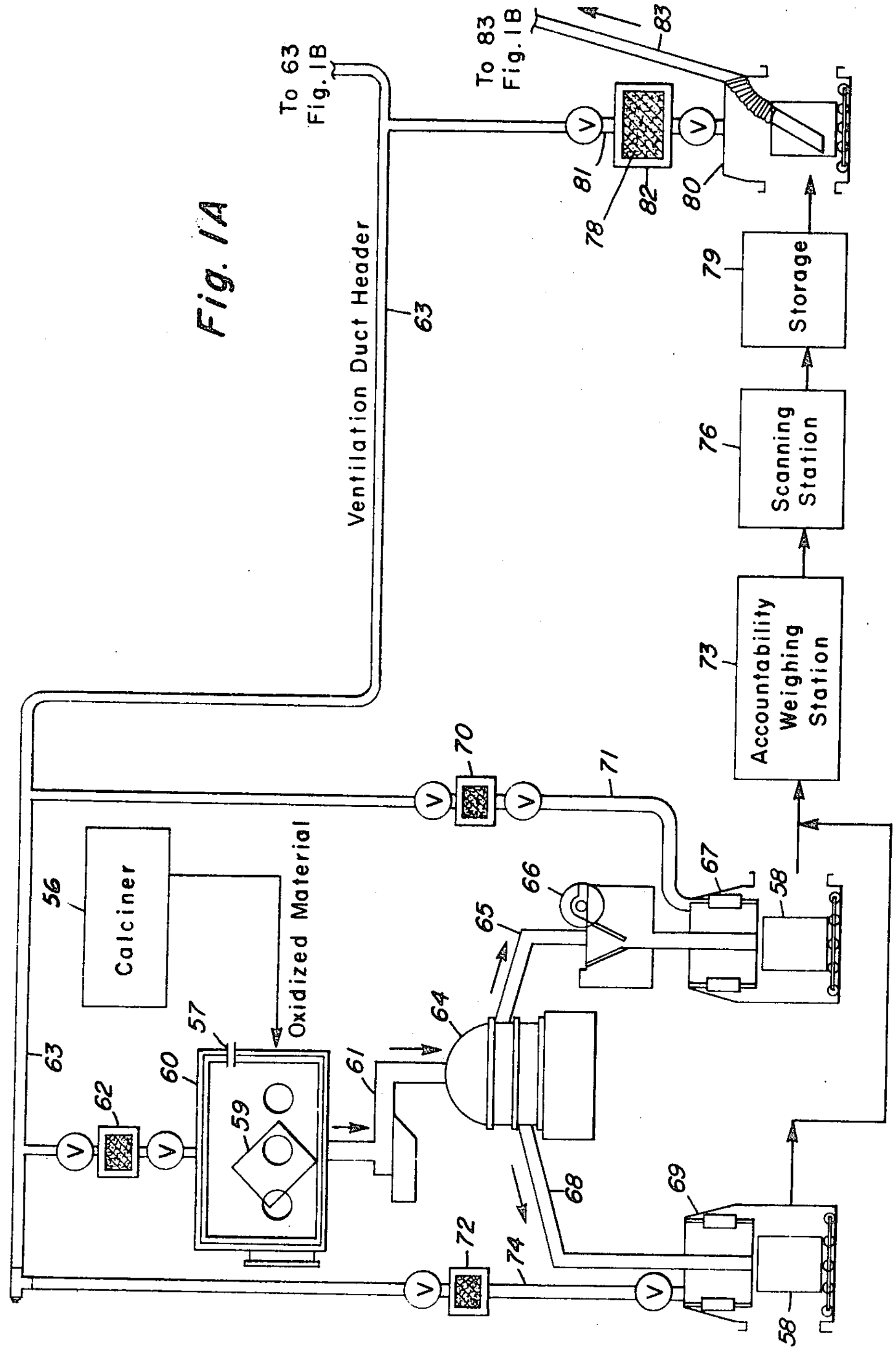
FIG. 1 is a schematic diagram of a system for recovering the nuclear fuel materials from filter media and other scrap materials according to the teachings of this invention.

The foregoing objects and others are achieved by the present invention of a process for recovering in solution form enriched nuclear fuel compounds from scrap materials, including spent filter media. The process comprises the steps of:

(a) calcining the precursor material, other than the filter media, to yield an oxidized material or calcine;

(b) comminuting the oxidized material to form a particulate material of particle size less than about 250 microns;

(c) contacting the particulate material with an acid containing some recycled acid in a mechanically agitated leaching zone of a nuclear-safe configuration to dissolve the nuclear fuel compounds and yield an acid solution of the nuclear fuel compounds;

(d) mulching the filter media so that it is in the form of a particulate material;

(e) contacting the mulched media with the acid solution in a leaching zone;

(f) filtering the insoluble solids from the acid solution in a filtering zone;

(g) separating suspended solids from the acid solution in a clarification zone;

(h) recycling at least a portion of the acid solution from the clarification zone to the leaching zone; and (i) collecting the remainder of the acid solution for subsequent treatment, such as with an organic solvent in a liquid-liquid extraction zone to recover the nuclear fuel from said solution.

The process can also include an optional preliminary screening step to insure that only the oxidized material being treated in the comminution step will be above the desired size range for contacting with the acid.

The process is particularly useful for recovering nuclear fuel values from ventilation filters and incinerator ash and is particularly useful when the nuclear fuel is an oxide of uranium or mixture of uranium and plutonium oxides. The invention also includes an apparatus for recovering nuclear fuel values from scrap materials, including spent filter media. The apparatus includes calcining means for calcining the scrap material, other than filter media, to form an oxidized material which is introduced into comminuting means for reducing the oxidized material into a particulate material of given particle size range. The comminuting means discharges the particulate material into a slab-shaped, nuclear-safe leaching means for contacting the particulate material with an acid solution, a portion of which can be a recycled acid solution. The slab-shaped leaching means provides substantially complete dissolution of the nuclear fuel portion of the particulate material with the aid of mechanical agitation. This yields an acid solution containing undissolved solids.

The apparatus further includes mulching means for mulching the nuclear fuel-containing filter media to yield mulched filter media in particulate form. Filter leaching and repulping means receives the mulched filter media containing nuclear fuel material and also receives the acid solution from the leaching means for contacting the filter media with the acid. The filter leaching and repulping means discharges the acid solution containing undissolved or insoluble solids into a separator means. The separator means removes the major portion of the undissolved or insoluble solids from the acid solution and discharges the acid solution to a surge and reagent heat tank means. In this tank, an adjustment can be made, such as adding additional acid, if desired. The tank provides a constant flow output to a clarification means that removes suspended residual solids from the acid solution. A portion of the acid solution is recycled in a recycle line to the leaching means for further dissolution of the nuclear fuel, and the remainder of the acid solution is pumped to a storage tank or treated to recover the nuclear fuel.

DESCRIPTION OF THE INVENTION

Figure 1B:
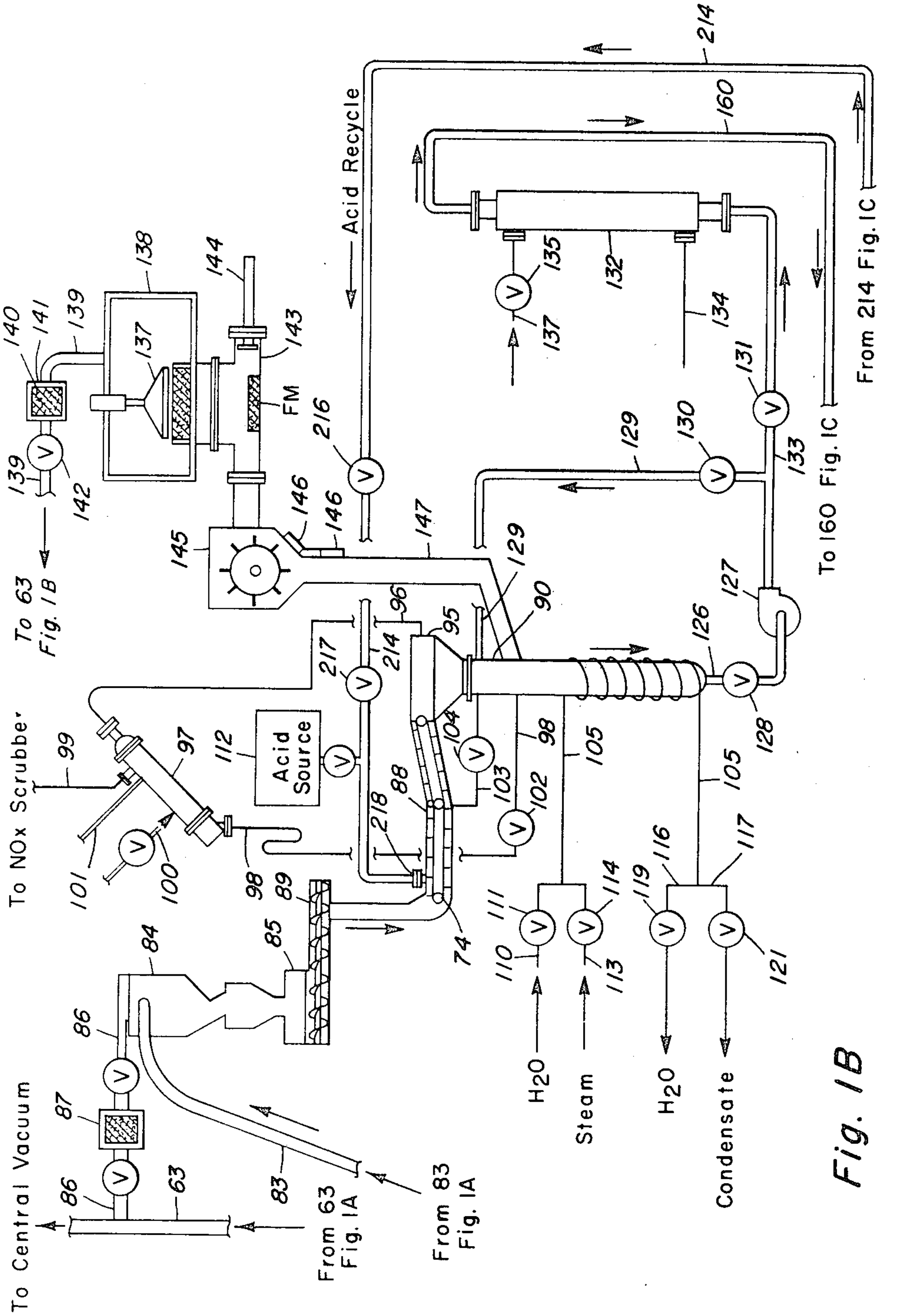
Figure 1C:
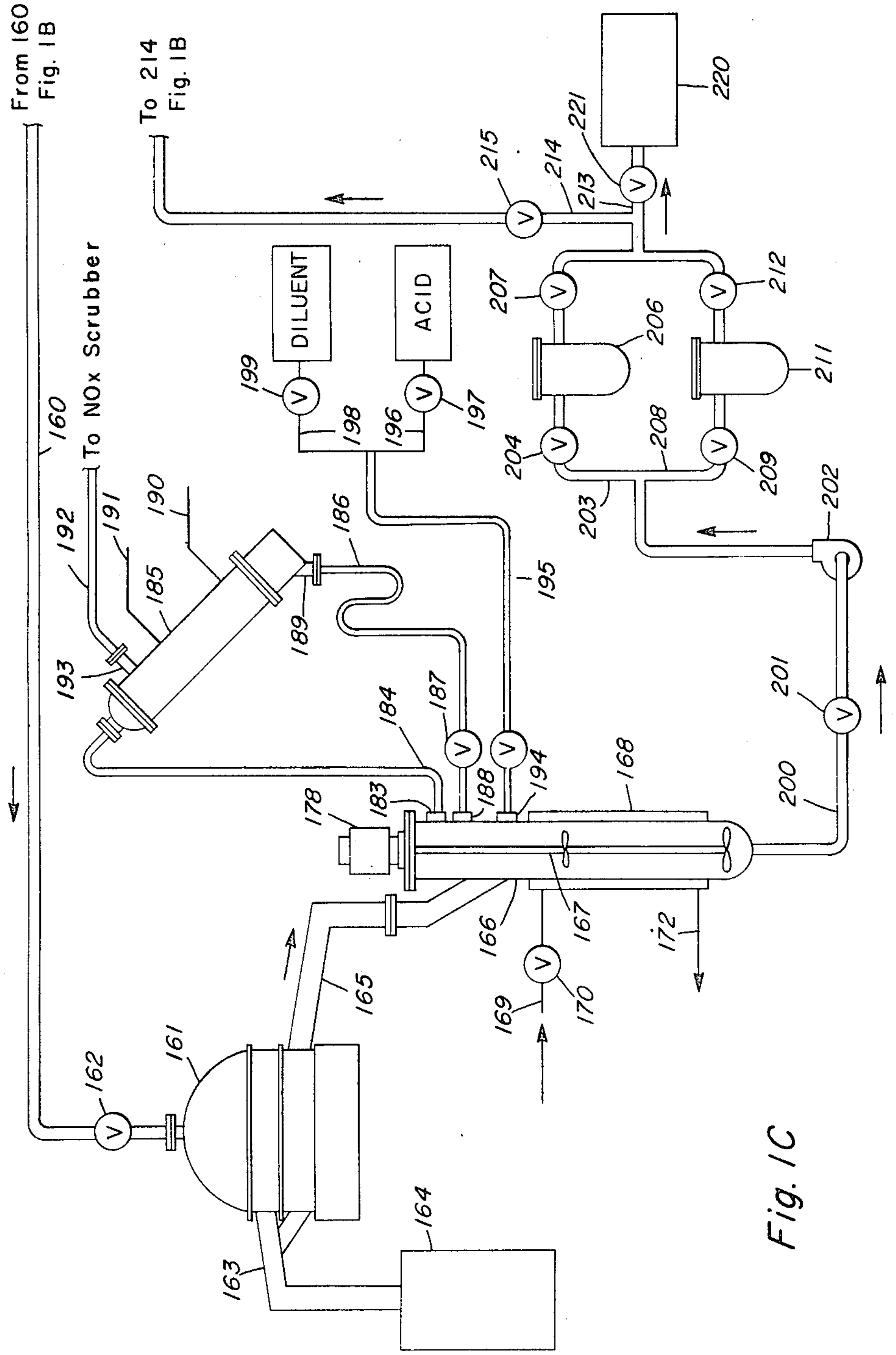

The invention will be more fully understood from the following detailed description and the accompanying drawing, wherein FIGS. 1A, 1B and 1C, taken together, show an apparatus for recovering in solution form compounds of enriched nuclear fuel material from scrap material.

Referring first to FIG. 1A and excluding any filter media, the scrap material is calcined in a calciner 56 to form an oxidized scrap material or ash that is collected in buckets 59 and each bucket 59 is dumped inside glove box 60 that receives air through inlet 57. The scrap material falls into vibratory feeder means 61. Dust in the air stream drawn from glove box 60 is collected in dust collector 62 and the dust-free air stream flows into ventilation duct header 63 that is connected to a central vacuum drawing means. The vibratory feeder means 61 feeds the scrap material to a screening means 64 that separates scrap material into two portions based on particle size, namely, one portion greater than and one portion less than about 250 microns. The larger particle portion is fed through conduit 65 to a comminuting or crushing means 66, which reduces the over-size scrap material to a size less than about 250 microns (hereinafter particulate material). The particulate material leaves crushing means 66 for loading into containers 58 held in loading station 67. The particulate material of a size less than about 250 microns passes from screening means 64 through conduit 68 to loading station 69, where the particulate material is loaded into containers 58. Stations 67 and 69 are respectively connected to ventilation duct header 63 by lines 71 and 74, which are provided with dust collectors 70 and 72 for collecting airborne dust.

Containers from stations 67 and 69 are moved to accountability weighing station 73 for weighing and then to scanning station 76, where the amount of nuclear fuel present in the particulate material is determined and recorded. This is done by scanning each container with an isotopic assay scanner for an indication of the radioactive content. Then each container is moved to storage station 79 for accumulation.

A container unloading station 80 is provided to unload the containers taken from storage station 79, as shown in FIG. 1A. The unloading station 80 is connected to the ventilation duct header 63 through line 81, and line 81 contains dust filter 78 held in filter housing 82 for removing airborne dust. Conduit 83 is provided between unloading station 80 in FIG. 1A and vacuum-drawing unit 84, shown in FIG. 1B, so that the particulate material dumped from the containers in unloading station 80 is drawn through conduit 83 to vacuum-drawing unit 84 for collection in vibratory feeding unit 85. Vacuum-drawing unit 84 discharges substantially solid-free air through line 86 containing an absolute filter in housing 87 and into ventilation duct header 63.

Vibratory feeding unit 83 feeds the particulate material into screw conveyor means 89. Conveyor means 89 discharges the particulate material to a slab-shaped leaching means 88. Here the particulate material is contacted with an acid solution, such as a nitric acid solution, entering leaching means 88 from recycle line 214 (described more fully below). If needed, supplementary acid can be introduced from acid source 112. The contacting is conducted for a sufficient time so that the nuclear fuel material present in the particulate material is substantially completely leached out to form an acid solution. When the nuclear fuel is $UO_2$ and the acid is an 8 normal nitric acid solution at a temperature in the range of 60° to 100° C., an acid solution with a concentration in the range of 30 to 100 grams of $UO_2$/liter is achieved. The conveyor belt 74 conveys the undissolved particulate material from leaching means 88 into filter leach and repulp tank 90.

Filter leach and repulp tank 90 also receives mulched filter media for treatment through pipe 147, and the source of the mulched filter media is as follows. A filter disassembly station enclosed in housing 138 is provided for removing nuclear fuel-containing filter media from filter frames. Vent line 139, controlled by valve 142, connects housing 138 to an absolute filter 140 held in a filter housing 141 for removing air-borne particulate material from the air stream drawn from housing 138. Filtered air passes through line 139 to the ventilation duct header 63. The filter medium is driven from the filter frames in disassembly station housing 138 by means of ram 137, which discharges the medium into chamber 143. Ram 144 is provided to move filter media FM into the heavy-duty mulcher 145. Pipe 147 connects the discharge end of mulcher 145 to tank 90, and vibration means 146 is provided on mulcher 145 and pipe 147 to facilitate the discharge of mulched filter media into tank 90.

Acid fumes and evaporated water rise in tank 90 to the expanded upper portion 95 and pass through line 96 into reflux condenser 97. Condenser 97 is provided with water-cooling lines 100 and 101. The condensed liquid from condenser 97 is returned by way of line 98 through open valve 102 into the upper portion of filter leach and repulp tank 90. Noncondensed gases, such as nitrogen oxides, are removed from condenser 97 through line 99 and sent to a nitrogen oxide scrubber (not shown). Bypass line 103 with valve 104 is also provided between the leacher 88 and the filter leach and repulp tank 90 for draining leacher 88. Lines 110 and 113, controlled by valves 111 and 114 respectively, provide cold water or process steam through line 105 as desired to cool or heat tank 90. Warmed cooling water or condensed steam, as the case may be, is discharged through line 105 into lines 116 or 117 controlled by valves 119 or 121 respectively.

The liquid-solids (acid solution—solids) mixture produced in tank 90 is discharged through line 126 controlled by valve 128 and pumped by means of pump 127, either partly or entirely as a recycle stream to the top of tank 90 through line 129 controlled by valve 130, or to heat exchanger 132 through line 133 controlled by valve 131. Whether part or all of the liquid-solids mixture is pumped to tank 90 depends upon the concentration of nuclear fuel dissolved in the liquid portion of the mixture. Cooling water is provided to heat exchanger 132 by means of lines 134 and 137, and the flow is controlled by valve 135.

The cooled mixture flows from heat exchanger 132 in FIG. 1B through line 160, controlled by valve 162, to separator means 161, shown in FIG. 1C. Various embodiments of separator means 161 can be employed, such as roughing filters, screens and centrifuges. It is preferred to use a wet pulp separator, which consists of vibrating screen means for removal of filter media and other undissolved solids. The filter media and other undissolved solids are discharged from separator means 161 through line 163 into a collector 164, where they are packaged for disposal. The liquid is discharged from separator means 161 through line 165 into a surge and reagent heat tank 166. The acid solution in tank 166 is stirred by automated agitator means 167 driven by motor 178 and heated by a steam jacket 168 surrounding the lower portion of tank 166. Process steam is provided to jacket 168 by means of lines 169 and 172, and the flow is controlled by valve 170.

Vapor from tank 166 is discharged from outlet 183 through line 184 to reflux condenser 185. The vapor condensed in condenser 185 is returned in line 186, controlled by valve 187, to tank 166 at entry port 188. Cold water is provided to condenser 185 by means of lines 190 and 191. Noncondensed gases, such as nitrogen oxides, are removed from condenser 185 through outlet 193 and line 192 and sent to a nitrogen oxide scrubber (not shown).

Acid, preferably nitric acid, is supplied to tank 166 through port 194 from a source of acid that feeds into line 196 (controlled by valve 197) and into line 195. The acid can be diluted by diluent, such as deionized water, from a source that feeds into line 198 (controlled by valve 199) and into line 195.

The acid solution flows from the outlet of tank 166 into line 200 controlled by valve 201 and is pumped by pump 202 to one of two filtering means 206 or 211 through line 203 (controlled by valve 204) or line 208 (controlled by valve 209), respectively. One possible filtering means is a sock-type filter, but other possible filtering means can be used, such as vacuum filters, plate and frame filters and centrifuges. Dual filtering means are provided to enable continuously running the process while cleaning one of the filters. The acid solution flows from the filtering means being used to line 213 and storage tank (or tanks) 220 when valve 221 in line 213 is open and valve 215 in line 214 is closed, or to recycle line 214 when valve 221 in line 213 is closed and valve 215 in line 214 is open. The acid solution admitted to line 214 flows to inlet 218 of slab-shaped leaching means 88, as shown in FIG. 1B. In practice, a portion of the acid solution can be recycled to the leaching means 88, while the remainder is stored or all of the acid solution can be recycled if a higher concentration of nuclear fuel material in the acid solution is desired.

A typical scrap material contains the nuclear fuel in the form of enriched uranium (U-238 with from 2 to 5 percent or more U-235), with the uranium being typically in compound form, such as oxide, carbide, etc. However, other nuclear fuels can be recovered in the practice of the process of this invention, such as plutonium compounds, thorium compounds or mixtures of uranium compounds with either plutonium compounds or thorium compounds or both. The nuclear fuel content of the scrap can vary from very low concentrations of 5 percent or less for waste materials, such as rags, coveralls, etc., up to about 100 percent by weight of nuclear fuel (e.g., improperly sintered pellets, cracked or chipped pellets).

Figure 2:
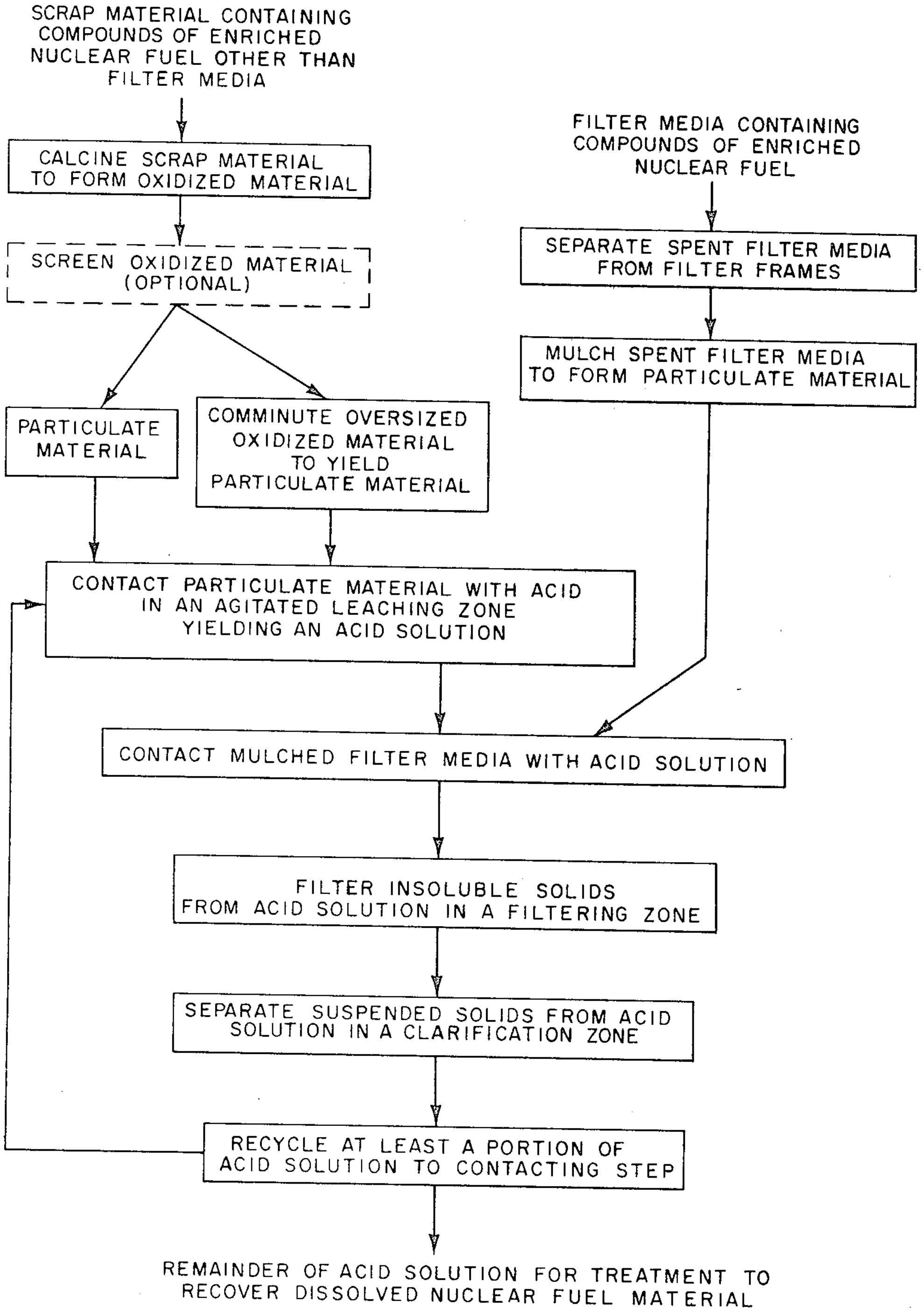
FIG. 2 is a flow diagram showing the sequential steps of the process disclosed in this invention.

Referring now to FIG. 2, there is shown a flow diagram illustrating the steps of the process of this invention. The first step of the process is calcining the scrap material other than filter media at a temperature in the range of 750° to 1000° C. to yield an oxidized scrap material or ash containing the nuclear fuel in readily soluble form.

Since the oxidized material has a wide range of particle sizes, the material is screened in an optional step in order to separate any particles greater than about 250 microns in size. These oversized particles are comminuted, preferably by hammer milling or jaw crushing, to yield a particulate material of about 10 to about 250 microns in size. When the screening step is not used, all the material is subjected to a grinding step.

The calcine, now more conveniently referred to as particulate material, is contacted with an acid in a slab-shaped leaching zone of nuclear-safe geometry, preferably in a nitric acid bath maintained at a temperature in the range of 60° to 100° C., with an acid concentration of about 3 to about 8 normal. The particles are agitated by mechanical agitation and are maintained in contact with the acid for a residence time of about 15 to 30 minutes to ensure dissolution of the nuclear fuel compounds, thus forming an acid solution containing a concentration of about 30 to 100 grams of nuclear fuel/liter. While it is preferred to use nitric acid, other acids can be used, such as sulfuric acid. The controlled feeding of material to the leaching zone limits the reaction rate of acid with the nuclear fuel compound and the evolution of gas from the reaction and yields an acid solution containing dissolved nuclear fuel.

Spent filter media containing nuclear fuel material are separated from their filter frames and then mulched so that the media are converted to a particulate material. The particles of filter media are contacted with the acid solution to dissolve the nuclear fuel material held by the media.

The nonsuspended insoluble solids and filter media are separated from the acid solution by filtering in a filtering zone and suspended solids are separated from the acid solution in a clarification zone. At least a portion of the acid solution is recycled to the slab leaching zone, with the remainder being collected for subsequent treatment for recovery of the dissolved nuclear fuel.

The portion of the acid solution from the clarification zone not recycled can be emptied into a storage zone for accumulation of a sufficient quantity, at which time the nuclear fuel solution is contacted with an organic solvent to extract the nuclear fuel material in a liquid-liquid extraction zone. Also, the nuclear fuel may be precipitated from the acid solution by using hydrogen peroxide or alkaline materials.

It will be appreciated that the foregoing detailed description of the process of this invention presents a continuous process; however, the invention can be practiced as a discontinuous or batch-type process. In this practice, all the initial acid solution from the clarification zone is recycled to the slab leaching zone on a continuous basis until the desired concentration of nuclear fuel is achieved in the acid slurry, at which time the acid slurry can be emptied into the storage zone or treated as discussed in the preceding paragraph.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. An apparatus for recovering nuclear fuel in solution form from scrap materials, including spent filter media, comprising in combination:

(a) calcining means for calcining the scrap materials other than the spent filter media to form an oxidized material that is fed to (b) comminuting means for crushing the oxidized material into a particulate material of desired particle size for feeding to (c) a slab-shaped leaching means for contacting the particulate material with an acid solution at a rate enabling substantially complete dissolution of the nuclear fuel portion of the particulate material with the aid of mechanical agitation means to yield an acid solution, (d) mulching means for mulching the spent filter media to yield a mulched filter media in particulate form, (e) filter leach and repulping means for receiving the mulched filter media containing nuclear fuel material and for receiving the acid solution from the leaching means in a manner that the mulched filter media is contacted with the acid solution and the nuclear fuel material held by the mulched filter media is substantially dissolved in the acid solution, (f) separator means for receiving the acid solution with undissolved solids from means (e) and removing the nonsuspended undissolved solids from the acid solution, said separator means feeding the acid solution to (g) leachate surge and reagent heat tank means for providing a constant output of the acid solution to (h) clarification means that removes suspended solids from the acid solution, (i) a recycle line for receiving at least a portion of the acid solution from the clarification means and recycling said portion to the leaching means, and (j) means for receiving the remainder of the acid solution.

2. An apparatus according to claim 1 further including screening means receiving the oxidized material from the calcining means with the screening means directing particles not passing therethrough to the comminuting means and particles passing through the screening means to the leaching means.

3. An apparatus according to claim 2 in which the screening means has openings of about 250 microns in size.

* * * * *